(12) United States Patent
Takagaki et al.

(10) Patent No.: US 11,462,756 B2
(45) Date of Patent: Oct. 4, 2022

(54) FUEL CELL SYSTEM

(71) Applicant: Toyota Jidosha Kabushiki Kaisha, Toyota (JP)

(72) Inventors: Nakaya Takagaki, Toyota (JP); Hiromichi Sato, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 16/570,270

(22) Filed: Sep. 13, 2019

(65) Prior Publication Data

US 2020/0099070 A1 Mar. 26, 2020

(30) Foreign Application Priority Data

Sep. 25, 2018 (JP) .............................. JP2018-179438

(51) Int. Cl.
| | |
|---|---|
| *H01M 8/04746* | (2016.01) |
| *H01M 8/04044* | (2016.01) |
| *H01M 8/04537* | (2016.01) |
| *H01M 8/04701* | (2016.01) |
| *H01M 8/04029* | (2016.01) |

(52) U.S. Cl.
CPC ... *H01M 8/04768* (2013.01); *H01M 8/04029* (2013.01); *H01M 8/04044* (2013.01); *H01M 8/04634* (2013.01); *H01M 8/04723* (2013.01); *H01M 8/04731* (2013.01)

(58) Field of Classification Search
CPC ......... H01M 8/04029; H01M 8/04044; H01M 8/04302; H01M 8/04303; H01M 8/04634; H01M 8/04723; H01M 8/04731; H01M 8/04768; Y02E 60/50; Y02T 10/70; Y02T 10/7072; Y02T 90/14; Y02T 90/40
See application file for complete search history.

(56) References Cited

U.S. PATENT DOCUMENTS

| | | | |
|---|---|---|---|
| 2002/0106543 A1 | 8/2002 | Sonntag et al. | |
| 2006/0269807 A1* | 11/2006 | Fujita ................ | H01M 8/04044 429/435 |
| 2009/0096464 A1* | 4/2009 | Tanaka .............. | H01M 8/04567 324/551 |

(Continued)

FOREIGN PATENT DOCUMENTS

| | | |
|---|---|---|
| CN | 1813370 A | 8/2006 |
| CN | 106058281 A | 10/2016 |

(Continued)

*Primary Examiner* — Brittany L Raymond
(74) *Attorney, Agent, or Firm* — Dinsmore & Shohl LLP

(57) ABSTRACT

A fuel cell system that includes: an ion exchanger that is provided at a circulation path and that restores insulation resistance of a coolant; a detector that is provided at the circulation path at a downstream side of a radiator in a circulation direction of the coolant and that detects conductivity of the coolant; and a controller that is electrically connected to the detector and a pump and that controls driving of at least the pump. In a state in which the pump is stopped and in a case in which the insulation resistance of the coolant, which is obtained from the conductivity of the coolant that has been detected by the detector, becomes equal to or less than a specific value, the controller starts the driving of the pump such that the coolant passes through the ion exchanger.

8 Claims, 3 Drawing Sheets

(56) References Cited

U.S. PATENT DOCUMENTS

| | | | |
|---|---|---|---|
| 2015/0072259 A1* | 3/2015 | Furukoshi | H01M 8/04029 429/436 |
| 2016/0301089 A1* | 10/2016 | Sato | H01M 8/1004 |
| 2017/0133696 A1 | 5/2017 | Komatsubara et al. | |

FOREIGN PATENT DOCUMENTS

| | | |
|---|---|---|
| JP | 2002-319426 A | 10/2002 |
| JP | 2005-050731 A | 2/2005 |
| JP | 2009104814 | 5/2009 |
| JP | 2016-018607 A | 2/2016 |
| JP | 2016-201279 A | 12/2016 |
| JP | 2018-120659 A | 8/2018 |

* cited by examiner

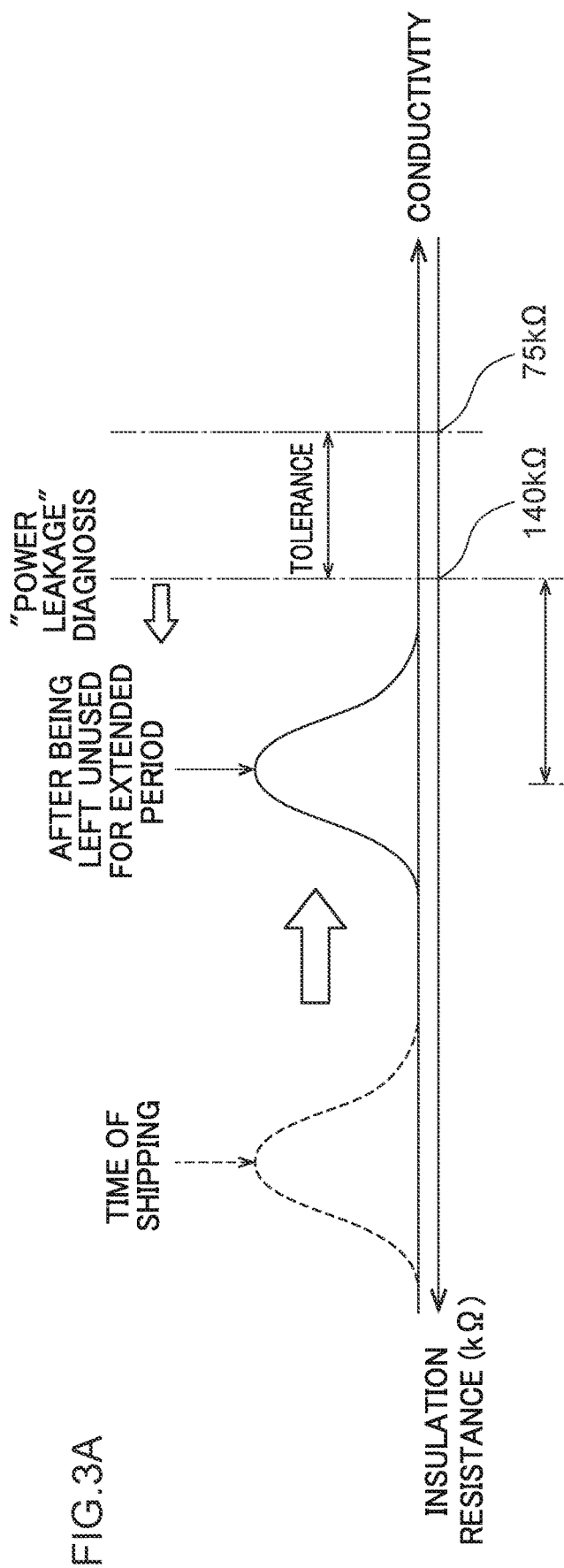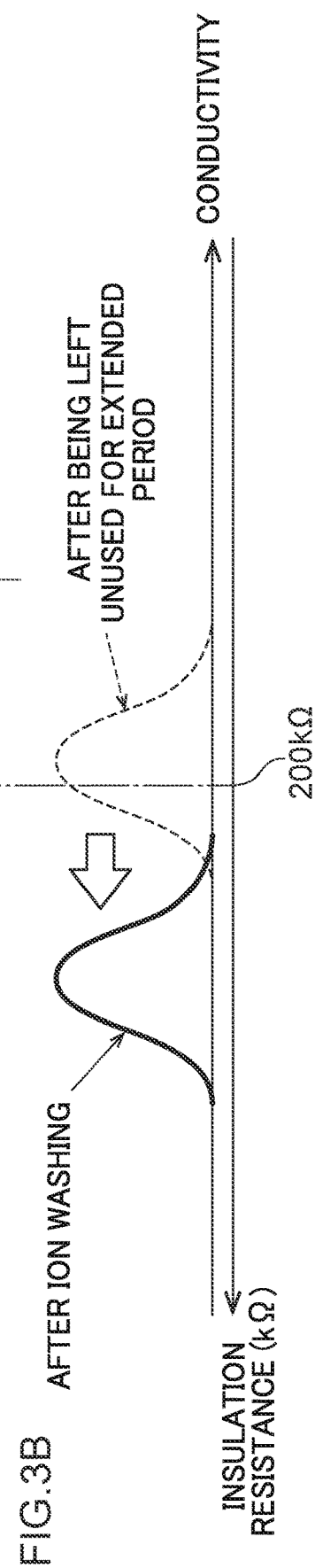

FUEL CELL SYSTEM

CROSS-REFERENCE TO RELATED APPLICATION

This application is based on and claims priority under 35 USC 119 from Japanese Patent Application No. 2018-179438 filed on Sep. 25, 2018, the disclosure of which is incorporated by reference herein.

BACKGROUND

Technical Field

The present disclosure relates to a fuel cell system.

Related Art

A fuel cell power generation system has been proposed in which a switching section is switched to a first branch line side up to a predetermined duration from starting up the fuel cell power generation system, such that battery cooling water that has left a fuel cell is passed through a water purifier. Then after the predetermined duration has elapsed, the switching section is switched to a second branch line side to return the battery cooling water that has left the fuel cell to a water tank (see, for example, Japanese Patent Application Laid-Open (JP-A) No. 2009-104814).

This configuration enables the water quality of the battery cooling water to be purified swiftly when the fuel cell power generation system is started up. However, the conductivity of the battery cooling water increases (the insulation resistance of the battery cooling water decreases) when a state in which the fuel cell power generation system is not started up, namely a stationary state of a pump that circulates the battery cooling water, persists for an extended period due to elution of ionic substances. The fuel cell power generation system might possibly be diagnosed to have "power leakage" when attempting to start up the fuel cell power generation system, preventing start-up.

SUMMARY

An aspect of the disclosure is a fuel cell system that includes: a fuel cell; a circulation path configured to circulate a coolant that cools the fuel cell; a pump that is provided at the circulation path and that causes the coolant to circulate; a radiator that is provided at the circulation path and that dissipates heat from the coolant; an ion exchanger that is provided at the circulation path and that restores insulation resistance of the coolant; a detector that is provided at the circulation path at a downstream side of the radiator in a circulation direction of the coolant and that detects conductivity of the coolant; and a controller that is electrically connected to the detector and the pump and that controls driving of at least the pump, in a state in which the pump is stopped and in a case in which the insulation resistance of the coolant, which is obtained from the conductivity of the coolant that has been detected by the detector, becomes equal to or less than a specific value, the controller starting the driving of the pump such that the coolant passes through the ion exchanger.

BRIEF DESCRIPTION OF DRAWINGS

FIG. 3A is an explanatory diagram illustrating insulation resistance (conductivity) after a fuel cell system of related technology has been left unused for an extended period.

FIG. 3B is an explanatory diagram illustrating insulation resistance (conductivity) after a fuel cell system according to the present exemplary embodiment has been left unused for an extended period.

DETAILED DESCRIPTION

Detailed explanation follows regarding an exemplary embodiment of the present disclosure, with reference to the drawings. Note that fuel cell systems such as a fuel cell system 10 according to the present exemplary embodiment are primarily installed in vehicles. In the following explanation, an upstream side in a coolant circulation direction is sometimes referred to simply as the "upstream side", and a downstream side in the circulation direction is sometimes referred to simply as the "downstream side". The phrase "extended period" refers to a period of, for example, two weeks or longer in the present exemplary embodiment.

Figure 1:
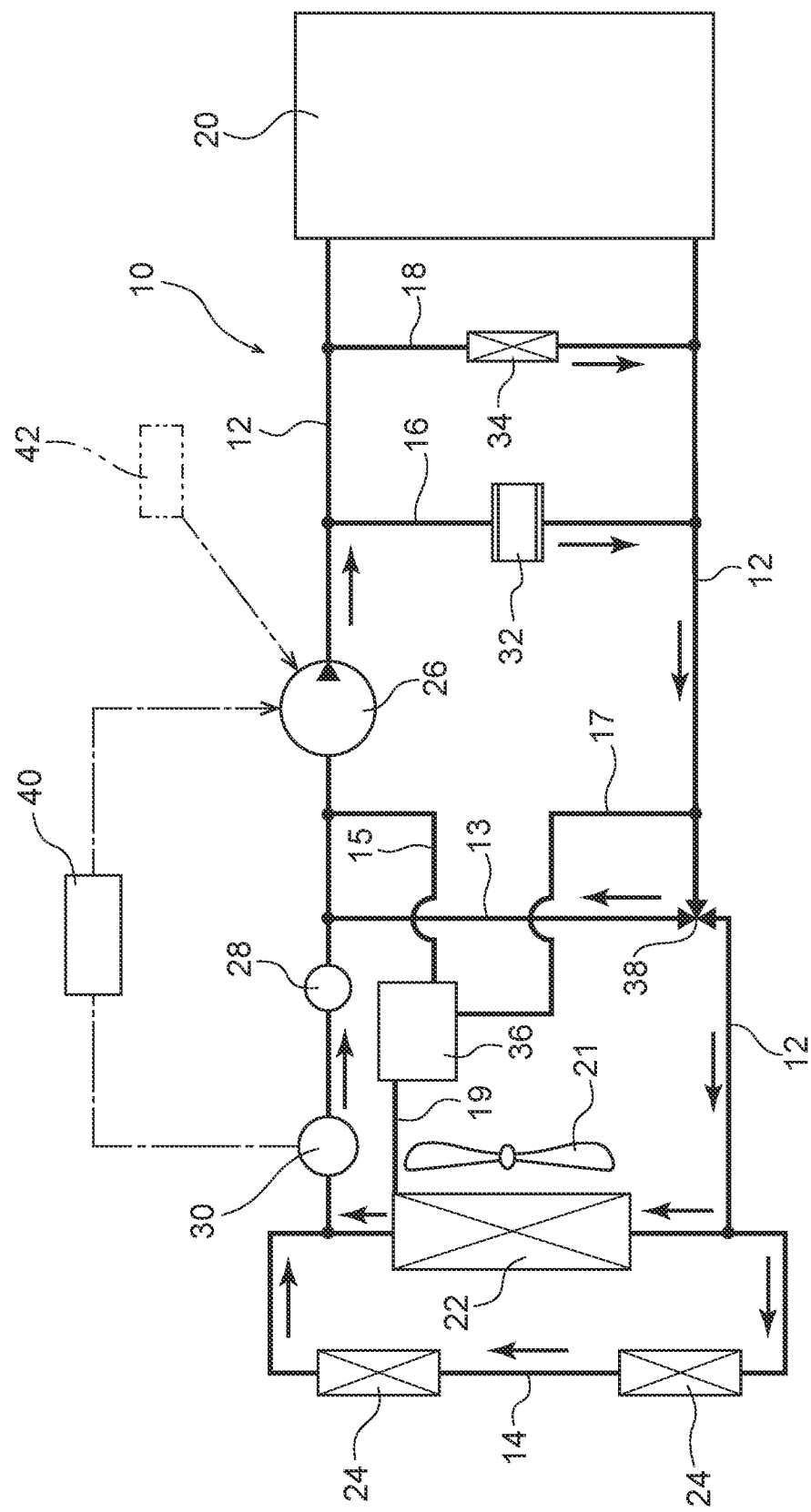
FIG. 1 is a schematic diagram illustrating a fuel cell system according to an exemplary embodiment.

As illustrated in FIG. 1, the fuel cell system 10 according to the present exemplary embodiment includes a fuel cell (FC stack) 20 that employs a chemical reaction between hydrogen and oxygen to generate electricity, and a flow path 12, serving as a circulation path around which a coolant (cooling water) circulates to cool the interior of the fuel cell 20. A pump (water pump) 26 that circulates the coolant is provided on the flow path 12.

The pump 26 has a configuration capable of being used at low voltages, enabling the pump 26 to be driven at any time (even when the fuel cell 20 has not been started up, for example when the vehicle is parked). Namely, the pump 26 is capable of being driven by a battery 42 provided separately to the fuel cell 20 in the vehicle. This approach is adopted since a configuration in which the pump 26 was only capable of being used at high-voltages would require the fuel cell 20 to be started up.

To elaborate further, the fuel cell 20 would not be able to start up if the insulation resistance of the coolant were to decrease due to ionic substances being eluted into the coolant to such an extent that a high-voltage system of the vehicle could not be started up, for example when the vehicle has been left unused for an extended period. This would accordingly mean that the pump 26 could not be driven (since any attempt to start up the fuel cell 20 would result in power to drive the pump 26 being immediately cut off by a controller 40, described later).

A radiator 22, serving as a radiator that dissipates heat from the coolant to the atmosphere, is provided on the flow path 12 at a position on the upstream side of the pump 26. A fan 21 that is used to draw a cooling airflow into the radiator 22 is disposed facing the radiator 22. An upstream side end portion and a downstream side end portion of a flow path 14, on which two sub radiators 24 that also dissipate heat of the coolant into the atmosphere are provided in series, are connected to the flow path 12 on the upstream side and the downstream side of the radiator 22 respectively. The sub radiators 24 are thus provided in parallel with the radiator 22.

A detector (conductivity meter) 30 that detects conductivity of the coolant is provided on the flow path 12 at a position in the vicinity of the radiator 22, on the downstream side of the radiator 22 and on the upstream side of the pump 26. A temperature sensor 28 that detects the temperature of the coolant is provided on the flow path 12 at a position on the downstream side of the detector 30 and on the upstream side of the pump 26.

An upstream side end portion and a downstream side end portion of a flow path 16, on which an ion exchanger 32 is provided, are connected to the flow path 12 on the downstream side of the pump 26 and upstream side of the fuel cell 20, and connected to the flow path 12 on the downstream side of the fuel cell 20 respectively. Namely, the ion exchanger 32 is provided in parallel with the fuel cell 20 and the radiator 22.

The ion exchanger 32 is configured to restore the insulation resistance of the coolant (reduce the conductivity of the coolant) as the coolant passes through the interior of the ion exchanger 32. Note that the flow path 16 has a smaller diameter than the flow path 12, such that when the pump 26 is driven, some of the coolant flowing in the flow path 12 flows into the flow path 16 and passes through the interior of the ion exchanger 32.

An upstream side end portion of a flow path 18 on which an intercooler 34 is provided is connected to the flow path 12 on the downstream side of the location of connection of the flow path 12 to the upstream side end portion of the flow path 16. A downstream side end portion of the flow path 18 is connected to the flow path 12 on the upstream side of the location of connection of the flow path 12 to the downstream side end portion of the flow path 16. Namely, the intercooler 34 is also provided in parallel with the fuel cell 20 and the radiator 22.

The intercooler 34 is a heat exchanger that performs heat exchange with air that has increased in temperature due to being compressed by a supercharger, thereby cooling this air. Note that similarly to the flow path 16, the flow path 18 also has a smaller diameter than the flow path 12, such that when the pump 26 is driven, some of the coolant flowing in the flow path 12 flows into the flow path 18 and passes through the interior of the intercooler 34.

An upstream side end portion of a bypass flow path 13 is connected to the flow path 12 on the upstream side of the radiator 22 through a solenoid switching valve 38, and a downstream side end portion of the bypass flow path 13 is connected to the flow path 12 at a location on the downstream side of the temperature sensor 28 and on the upstream side of the pump 26.

The flow path 12 and a reservoir tank 36 are connected together through a first branch flow path 15 on the downstream side of the location where the downstream side end portion of the bypass flow path 13 is connected to the flow path 12. The flow path 12 and the reservoir tank 36 are also connected together through a second branch flow path 17 on the upstream side of the solenoid switching valve 38. The radiator 22 and the reservoir tank 36 are connected together through a third branch flow path 19.

Figure 2:
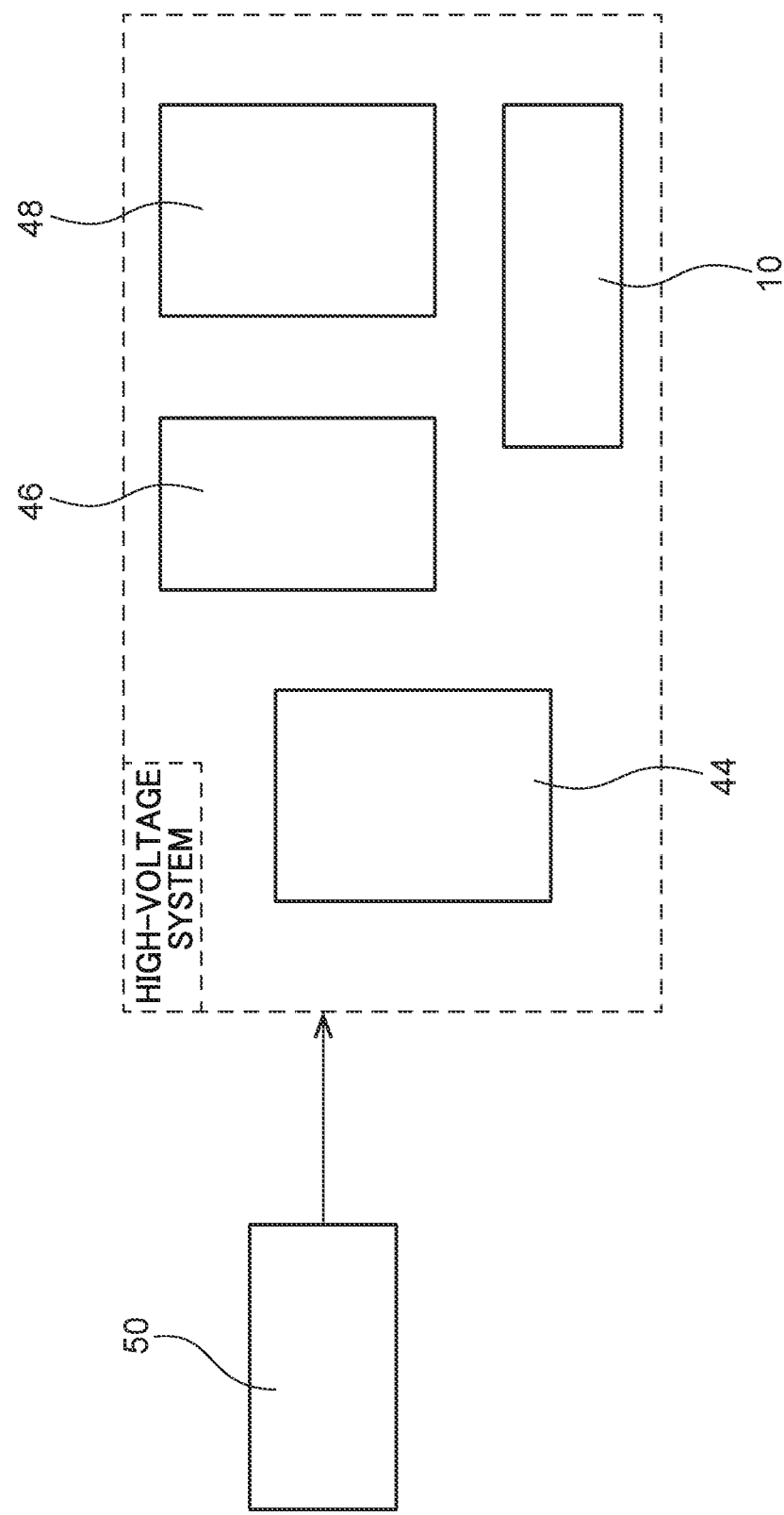
FIG. 2 is a block diagram illustrating a power leakage monitoring unit that monitors a composite insulation resistance in a high-voltage system including a fuel cell system according to the present exemplary embodiment.

Moreover, the fuel cell system 10 is provided with the controller 40 that is electrically connected to the detector 30 and the pump 26, and that controls at least driving of the pump 26. As illustrated in FIG. 2, a high-voltage system in the vehicle as a whole includes a high-voltage battery 44 that assists output of the fuel cell 20, a power conditioner 46 that converts DC power generated by the fuel cell 20 into AC power, a power control unit 48 that controls output of the fuel cell 20, the fuel cell system 10 (insulation resistance of the coolant), and the like. A composite insulation resistance of the high-voltage system is monitored by a power leakage monitoring unit 50.

Under high-voltage safety regulations, the vehicle is required to secure an insulation resistance of at least 100Ω per volt (1V) across the vehicle as a whole. Accordingly, in the fuel cell system 10, if, for example, the maximum voltage of the fuel cell 20 is 750V, the power leakage monitoring unit 50 monitors whether or not the insulation resistance of the coolant is below 750V×100Ω/V=75 kΩ.

Namely, if the insulation resistance of the coolant is below 75 kΩ, the power leakage monitoring unit 50 notifies a user of a "power leakage", and prevents the fuel cell 20 from being started up. In reality, since there is a tolerance due to the effect of charging the capacitance of the vehicle, the composite insulation resistance of the high-voltage system monitored by the power leakage monitoring unit 50 is monitored within a range of, for example, from 75 kΩ to 140 kΩ. Accordingly, in the following explanation, 140 kΩ is taken as a limit value for the composite insulation resistance of the high-voltage system monitored by the power leakage monitoring unit 50.

Explanation follows regarding operation of the fuel cell system 10 according to the present exemplary embodiment configured as described above.

Coolant is circulated around the flow paths 12, 14, 16, 18 by driving the pump 26. The coolant undergoes heat exchange with the fuel cell 20 (is heated by the fuel cell 20) on passing through the fuel cell 20. The coolant that has undergone heat exchange with the fuel cell 20 (that has been heated by the fuel cell 20) passes through the radiator 22 and the sub radiators 24, and undergoes heat exchange with a travel-induced airflow blowing toward the radiator 22 and the sub radiators 24, and the cooling airflow drawn toward the radiator 22 by the fan 21.

Namely, the heat of the coolant is dissipated into the atmosphere by the radiator 22 and the sub radiators 24, thus cooling the coolant. The cooled coolant then passes through the fuel cell 20 again and undergoes heat exchange with the fuel cell 20 (is heated by the fuel cell 20). This process is repeated so as to continuously cool the fuel cell 20.

Note that ionic substances are eluted into the coolant from the radiator 22 and the like (in particular, the radiator 22 has a high propensity to elute ions). This increases the conductivity of the coolant. Namely, the insulation resistance of the coolant decreases. Note that as described above, under high-voltage safety regulations, the vehicle is required to secure insulation resistance of at least 100Ω per volt (1V) across the vehicle as a whole.

Accordingly, in related technology, as illustrated in FIG. 3A, the respective components including the radiator 22 are washed with an aqueous cleaner (for example warm water) prior to assembly to the vehicle in order to improve the ion eluting properties of the respective components. This approach is adopted so that the power leakage monitoring unit 50 does not diagnose a "power leakage" when the vehicle is left unused for an extended period after the respective components have been assembled and the vehicle has been shipped.

Namely, the respective components including the radiator 22 are washed with the aqueous cleaner to elute and remove ionic substances in advance in order to secure insulation resistance higher than 140 kΩ, this being the limit value allowing for the tolerance in the composite insulation resistance of the high-voltage system monitored by the power leakage monitoring unit 50, even after the vehicle has been left unused for an extended period. A washing time (a washing time to secure insulation resistance higher than 140 kΩ) is required, and there is an increase in cost due to this washing.

In the fuel cell system 10 according to the present exemplary embodiment, the detector 30 to detect the conductivity of the coolant directly is provided on the flow path 12 in the vicinity of the radiator 22, which has a high propensity to elute ions. Detailed explanation follows regarding operation thereof.

When the vehicle is left unused for an extended period, since the pump 26 is obviously not being driven, the coolant does not pass through the ion exchanger 32 (ions are not washed away). Ionic substances thus gradually elute from the radiator 22, causing the conductivity of the coolant present in the flow path 12 in the vicinity of the radiator 22 to gradually increase. Namely, the insulation resistance of the coolant present in the flow path 12 in the vicinity of the radiator 22 gradually decreases.

Accordingly, in cases in which the vehicle has been left unused for an extended period (when the pump 26 has not been driven for an extended period), there is a possibility that when an attempt is made to start up the fuel cell 20, a "power leakage" will be diagnosed by the power leakage monitoring unit 50 and the fuel cell 20 will be unable to start up. The detector 30 is therefore used to detect the conductivity (maximum conductivity) of the coolant present in the flow path 12 in the vicinity of the radiator 22. Whether or not the insulation resistance (minimum insulation resistance) of the coolant, as derived from the detected conductivity, is a specific value (for example 200 kΩ) or lower is then determined.

As illustrated in FIG. 3B, in a state in which the pump 26 has remained stationary for an extended period and the insulation resistance of the coolant as derived from the conductivity of the coolant detected by the detector 30 has been determined to be the specific value (for example 200 kΩ) or lower, the controller 40 starts driving of the pump 26 automatically using power from the battery 42 provided to the vehicle separately to the fuel cell 20, even if the fuel cell 20 has not been started up.

Since the coolant passes through the ion exchanger 32 (ions are washed away), thereby removing the ions present in the coolant (reducing the conductivity), the insulation resistance of the coolant is quickly restored. Namely, when the fuel cell 20 is started up (when an attempt is made to start up the fuel cell 20), the frequency with which "power leakage" is diagnosed (and the user is notified) by the power leakage monitoring unit 50 can be greatly reduced (at least "power leakage" diagnoses attributable to the coolant can be more effectively suppressed or prevented).

Accordingly, the need to wash the respective components including the radiator 22 prior to assembly to the vehicle to the extent that the power leakage monitoring unit 50 does not diagnose a "power leakage" even when left unused for an extended period (until insulation resistance higher than 140 kΩ is secured) is eliminated. This thereby enables the time taken for washing to be reduced, enabling washing-related costs to be reduced.

After the pump 26 has been stopped (after the fuel cell 20 has been turned off), the controller 40 uses the detector 30 to detect the conductivity of the coolant at predetermined time intervals (for example every few hours) using power from the battery 42, so as to preempt a "power leakage" diagnosis by the power leakage monitoring unit 50.

Accordingly, even when the pump 26 remains in a stationary state for an extended period, it is possible to swiftly determine when the insulation resistance of the coolant, as found from the conductivity of the coolant, has reached the specific value (for example 200 kΩ) or lower. This enables the power leakage monitoring unit 50 to be more effectively suppressed or prevented from diagnosing a "power leakage" when the fuel cell 20 is started up (when an attempt is made to start up the fuel cell 20). Note that the controller 40 is configured to control the respective sections using power from the fuel cell 20 after the fuel cell 20 has been started up.

The specific value for the insulation resistance used as a criterion for starting the driving of the pump 26 is set to a higher value than the limit value that allows for the tolerance in the composite insulation resistance of the high-voltage system monitored by the power leakage monitoring unit 50, namely a higher value than 140 kΩ. The insulation resistance of the coolant is thus restored earlier (after a shorter amount of time) than in cases in which driving of the pump 26 is started so as to make the coolant flow toward the ion exchanger 32 only once the limit value (140 kΩ) or lower has been reached.

The tolerance in the composite insulation resistance of the high-voltage system monitored by the power leakage monitoring unit 50 differs from vehicle to vehicle due to the influence of external factors such as charging the capacitance of the vehicle. However, since driving of the pump 26 is started based on the criterion of the specific value (for example 200 kΩ) that is higher than the limit value (140 kΩ) allowing for this tolerance, the fuel cell system 10 according to the present exemplary embodiment has the advantage of not needing to give consideration to the effects of such external factors including charging the capacitance of the vehicle, namely not needing to give consideration to the tolerance.

Although explanation has been given regarding the fuel cell system 10 according to the present exemplary embodiment with reference to the drawings, the fuel cell system 10 according to the present exemplary embodiment is not limited to the system illustrated in the drawings, and design modifications may be implemented as appropriate. For example, the fuel cell system 10 according to the present exemplary embodiment is not limited to a configuration for application to a vehicle.

The controller 40 is not limited to a configuration that uses the detector 30 to detect the conductivity of the coolant only at predetermined time intervals, and may, for example, be configured to additionally use the detector 30 to detect the conductivity of the coolant every time the fuel cell 20 is started up.

Moreover, the limit value of the composite insulation resistance of the high-voltage system monitored by the power leakage monitoring unit 50 is not limited to 140 kΩ. Likewise, the specific value of the insulation resistance employed as the criterion for starting driving of the pump 26 is not limited to 200 kΩ.

The ion exchanger 32 is not limited to a configuration provided in parallel with the fuel cell 20 and the radiator 22, and may be provided in series with the fuel cell 20 and the radiator 22. However, if the ion exchanger 32 is provided in series with the fuel cell 20 and the radiator 22, pressure loss of the pump 26 that conveys the coolant increases. Accordingly, the ion exchanger 32 may be connected in parallel with the fuel cell 20 and the radiator 22.

An object of the present disclosure is to obtain a fuel cell system capable of suppressing diagnosis of a "power leakage" when starting up a fuel cell, even when a stationary state of a pump that circulates a coolant used to cool the fuel cell has persisted for an extended period.

A first aspect of the disclosure is a fuel cell system that includes: a fuel cell; a circulation path configured to circulate a coolant that cools the fuel cell; a pump that is provided at the circulation path and that causes the coolant to circulate; a radiator that is provided at the circulation path and that dissipates heat from the coolant; an ion exchanger that is provided at the circulation path and that restores insulation resistance of the coolant; a detector that is provided at the circulation path at a downstream side of the radiator in a circulation direction of the coolant and that detects conductivity of the coolant; and a controller that is electrically connected to the detector and the pump and that controls driving of at least the pump, in a state in which the pump is stopped and in a case in which the insulation resistance of the coolant, which is obtained from the conductivity of the coolant that has been detected by the detector, becomes equal to or less than a specific value, the controller starting the driving of the pump such that the coolant passes through the ion exchanger.

According to the first aspect, the controller starts driving of the pump that circulates the coolant to cool the fuel cell such that the coolant flows through the ion exchanger when the pump is in a stationary state and the insulation resistance of the coolant, as found from the conductivity of the coolant detected by the detector, has reached the specific value or lower. The insulation resistance of the coolant is thus quickly restored, suppressing diagnosis of a "power leakage" when the fuel cell is started up, even if the stationary state of the pump has persisted for an extended period.

A second aspect of the disclosure is the fuel cell system of the first aspect, wherein the controller starts the driving of the pump using power from a battery that is provided separately from the fuel cell.

According to the second aspect, the controller starts driving of the pump using power of the battery provided separately to the fuel cell. The insulation resistance of the coolant is thus quickly restored without starting up the fuel cell.

A third aspect of the disclosure is the fuel cell system of the first aspect or the second aspect, wherein the controller controls the detector so as to detect the conductivity of the coolant at a predetermined time interval after the pump has stopped.

According to the third aspect, the controller uses the detector to detect the conductivity of the coolant at predetermined time intervals after the pump has stopped. It is thus possible to swiftly determine when the insulation resistance of the coolant, as found from the conductivity of the coolant, has reached the specific value or lower even if the stationary state of the pump has persisted for an extended period. This suppresses diagnosis of a "power leakage" when the fuel cell is started up.

A fourth aspect of the disclosure is the fuel cell system of any of the first aspect to the third aspect, wherein the detector is disposed in the vicinity of the radiator.

According to the fourth aspect, the detector is disposed in the vicinity of the radiator. Note that the radiator has a greater propensity to elute ionic substances than other locations. The detector therefore detects the maximum conductivity of the coolant. Namely, determination is made as to whether or not the minimum insulation resistance of the coolant, as found from the conductivity of the coolant, is the specific value or lower. Diagnosis of a "power leakage" when the fuel cell is started up is thus even more effectively suppressed.

A fifth aspect of the disclosure is the fuel cell system of any of the first aspect to the fourth aspect, wherein the specific value is higher than a limit value of a composite insulation resistance of a high-voltage system that is monitored by a power leakage monitoring unit provided at a vehicle.

According to the fifth aspect, the specific value is a higher value than the limit value of the composite insulation resistance of the high-voltage system monitored by the power leakage monitoring unit provided to the vehicle. The insulator resistance of the coolant is thus restored more quickly (in a shorter amount of time) than in cases in which driving of the pump is started so as to make the coolant flow toward the ion exchanger only once the limit value or lower has been reached.

The present disclosure is capable of suppressing diagnosis of a "power leakage" when the fuel cell is started up, even when a stationary state of the pump used to circulate the coolant to cool the fuel cell has persisted for an extended period.

The invention claimed is:

1. A fuel cell system, comprising:
    a fuel cell;
    a circulation path configured to circulate a coolant that cools the fuel cell;
    a pump that is provided at the circulation path and that causes the coolant to circulate with a power from a battery that is different from the fuel cell;
    a radiator that is provided at the circulation path and that dissipates heat from the coolant;
    an ion exchanger that is provided at the circulation path and that restores insulation resistance of the coolant, with a flow path of which diameter is smaller than that of the circulation path, and parallel with the fuel cell;
    a detector that is provided at the circulation path and is adjacent to an exit of the radiator in a circulation direction of the coolant and that detects conductivity of the coolant;
    an intercooler provided in parallel with the fuel cell and the ion exchanger and configured to perform heat exchange with air; and
    a controller that is electrically connected to the detector and the pump and that controls driving of at least the pump,
    in a state in which the pump is stopped and in a case in which the insulation resistance of the coolant, which is obtained from the conductivity of the coolant that has been detected by the detector, becomes equal to or less than a specific value, the controller starting the driving of the pump such that the coolant passes through the ion exchanger before the fuel cell is started.

2. The fuel cell system of claim 1, wherein the controller controls the detector so as to detect the conductivity of the coolant at a predetermined time interval after the pump has stopped.

3. The fuel cell system of claim 1, wherein the controller controls the detector so as to detect the conductivity of the coolant each time the fuel cell is started.

4. The fuel cell system of claim 1, wherein the specific value is higher than a limit value of a composite insulation resistance of a high-voltage system that is monitored by a power leakage monitoring unit provided at a vehicle.

5. The fuel cell system of claim 1, wherein the ion exchanger is provided in parallel with the fuel cell and the radiator.

6. The fuel cell system of claim 1, wherein the detector detects the conductivity of the coolant at predetermined time intervals using power from a battery that is provided separately from the fuel cell after the fuel cell turns off.

7. The fuel cell system of claim 1, further comprising:
a bypass flow path provided in parallel with the radiator.

8. The fuel cell system of claim 1, further comprising:
a reservoir tank connected to a first branch flow path, a second branch flow path, and a third branch flow path, wherein:
the first branch flow path connects the reservoir tank and the circulation path;
the second branch flow path connects the reservoir tank and the circulation path; and
the third branch flow path connects the radiator and the reservoir tank.

\* \* \* \* \*